US 8,689,853 B2

(12) United States Patent
Clephas et al.

(10) Patent No.: US 8,689,853 B2
(45) Date of Patent: Apr. 8, 2014

(54) SUNSHADE ASSEMBLY

(75) Inventors: Petrus Martinus Josephus Clephas, Sevenum (NL); Michael Cornelis Anthonius Relouw, Merselo (NL); Harry Schrans, Belfeld (NL)

(73) Assignee: Inalfa Roof Systems Group B.V., Venray (NL)

( * ) Notice: Subject to any disclaimer, the term of this patent is extended or adjusted under 35 U.S.C. 154(b) by 109 days.

(21) Appl. No.: 13/147,548

(22) PCT Filed: Feb. 4, 2009

(86) PCT No.: PCT/EP2009/051252
§ 371 (c)(1),
(2), (4) Date: Sep. 21, 2011

(87) PCT Pub. No.: WO2010/088955
PCT Pub. Date: Aug. 12, 2010

(65) Prior Publication Data
US 2012/0000614 A1 Jan. 5, 2012

(51) Int. Cl.
*B60J 7/06* (2006.01)
(52) U.S. Cl.
USPC ..................... 160/370.22; 296/219
(58) Field of Classification Search
USPC .............. 160/266, 267.1, 268.1, 272, 370.22, 160/84.06; 296/24.43, 97.8, 98, 100.13, 296/100.15, 107.12, 219
See application file for complete search history.

(56) References Cited

U.S. PATENT DOCUMENTS

| | | | | |
|---|---|---|---|---|
| 5,287,908 A | * | 2/1994 | Hoffmann et al. | 160/121.1 |
| 7,568,752 B1 | * | 8/2009 | Lin | 296/97.8 |
| 2001/0035204 A1 | * | 11/2001 | Lin | 135/87 |
| 2005/0211390 A1 | * | 9/2005 | Lin | 160/23.1 |
| 2005/0236117 A1 | * | 10/2005 | Lin | 160/267.1 |
| 2006/0027347 A1 | * | 2/2006 | Boehm et al. | 160/273.1 |
| 2007/0056696 A1 | * | 3/2007 | Lin | 160/273.1 |
| 2007/0175603 A1 | * | 8/2007 | Lin | 160/273.1 |
| 2007/0256799 A1 | * | 11/2007 | Lin | 160/273.1 |

(Continued)

FOREIGN PATENT DOCUMENTS

| | | |
|---|---|---|
| DE | 102005030973 | 1/2007 |
| DE | 202007016323 | 3/2008 |
| EP | 2006136 | 12/2008 |
| WO | WO2005068236 | 7/2005 |

OTHER PUBLICATIONS

Official Search Report and Written Opinion of the European Patent Office in counterpart foreign application No. PCT/EP2009/051252 filed Feb. 4, 2009.

*Primary Examiner* — David Purol
(74) *Attorney, Agent, or Firm* — Steven M. Koehler; Westman, Champlin & Koehler, P.A.

(57) ABSTRACT

A sunshade assembly comprises a flexible sunscreen having two opposite lateral edges, a forward edge and a rearward edge. A rotatable winding shaft is provided for winding and unwinding the sunscreen at its rearward edge, and an operating beam connected to the forward edge of the sunscreen as well as two spaced guiding members cooperating with the opposite lateral edges of the sunscreen. The sunscreen near to each lateral edge is provided with a receiving arrangement for slideably receiving a tensioning member. Each receiving arrangement extends bow-shaped with its outer ends closer to the respective lateral edge than its parts between said outer ends. Each tensioning member further is a longitudinal member extending through a corresponding receiving arrangement and being tensioned in its longitudinal direction.

17 Claims, 4 Drawing Sheets

(56) References Cited

U.S. PATENT DOCUMENTS

| | | | |
|---|---|---|---|
| 2008/0006373 A1* | 1/2008 | Lin | 160/321 |
| 2008/0197655 A1 | 8/2008 | Oerke | |
| 2009/0008048 A1* | 1/2009 | Stark | 160/370.22 |
| 2009/0178771 A1* | 7/2009 | Lin | 160/370.22 |
| 2012/0000614 A1* | 1/2012 | Clephas et al. | 160/309 |
| 2012/0180961 A1* | 7/2012 | Lin | 160/370.22 |

* cited by examiner

SUNSHADE ASSEMBLY

CROSS-REFERENCE TO RELATED APPLICATION

This application is a Section 371 National Stage Application of International Application PCT/EP2009/051252 filed Feb. 4, 2009 and published as WO/2010/088955 in English.

BACKGROUND

The discussion below is merely provided for general background information and is not intended to be used as an aid in determining the scope of the claimed subject matter.

An aspect of the invention relates to a sunshade assembly, comprising a flexible sunscreen having two opposite lateral edges, a forward edge and a rearward edge, wherein a rotatable winding shaft is provided for winding and unwinding the sunscreen at its rearward edge, and an operating beam connected to the forward edge of the sunscreen as well as two spaced guiding members cooperating with the opposite lateral edges of the sunscreen.

When the sunscreen is made of a rather thick and heavy cloth, such as for example Alcantara™, it is difficult to keep the sunscreen taut when wound off from the winding shaft. As a result the sunscreen sags, specifically in its central part, resulting also in deformations at the lateral edges. This not only causes an unattractive appearance of the sunshade assembly but also may influence its proper operation.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. In accordance with an aspect of the present invention a sunshade assembly is provided near to each lateral edge with a receiving arrangement for slideably receiving a tensioning member, wherein each receiving arrangement extends bow-shaped with its outer ends closer to the respective lateral edge than its parts between said outer ends, and wherein each tensioning member is a longitudinal member extending through a corresponding receiving arrangement and being tensioned in its longitudinal direction.

Each tensioning member extends bow-shaped in accordance with the shape of the respective receiving arrangement.

The longitudinal tension in the tensioning member strives to straighten the shape of the tensioning member between its outer ends, thus resulting in an outwardly (that means towards the respective lateral edge of the sunscreen) directed force acting on the sunscreen through the receiving arrangement which keeps the sunscreen taut in a lateral direction.

In a first embodiment of the sunshade assembly the receiving arrangement comprises an elongate channel attached to or integral with the sunscreen. 'Attached to' means that the receiving arrangement is a separate part which has been attached to the sunscreen in an appropriate manner (for example by stitching, gluing or alike); 'Integral with' means that the receiving arrangement is formed from the material of the sunscreen itself.

In one embodiment of the sunshade assembly the elongate channel is defined by a channel-shaped pocket of flexible material attached to the sunscreen. Such a channel-shaped pocket basically defines a continuous channel causing a continuous load transfer from the tensioning members towards the sunscreen.

In an alternative embodiment of the sunshade assembly, however, it is conceivable too that the receiving arrangement comprises a succession of separate loop stitches positioned along a bow-shaped line and each wide enough for slideably accommodating the corresponding tensioning member.

These loop stitches define a number of separate loops through which the tensioning member extends. The number of stitches defines the spacing therebetween and thus the distribution of the load transferred from the tensioning member towards the sunscreen. Although, therefore, the use of separate stitches does not allow a fully continuous load transfer from the tensioning members towards the sunscreen, an advantage of the use of such stitches is the enhanced flexibility of the sunscreen and reduced width build up during winding onto the winding shaft.

In an embodiment of the sunshade assembly wherein each guiding member comprises at least a guide leg cooperating with the sunscreen at a respective lateral edge, the position of the receiving arrangement of the sunscreen is such that it is in an overlapping relation with said guide leg along its entire length. This means that the load transfer between the tensioning members and sunscreen occurs in said region where the sunscreen is supported by the guiding member.

In a preferred embodiment of the sunshade assembly the tensioning members each comprise a flexible rope, cable or alike of which one end is attached to the winding shaft and of which the opposite end is attached to a spring member for longitudinally tensioning the tensioning member. 'Flexible rope, cable or alike' should not be considered as limiting with respect to the choice of material for constructing the tensioning members.

In one embodiment the spring member is provided at the operating beam. For example, it is conceivable that the operating beam comprises an internal space for accommodating the spring member.

Although each tensioning member may be provided with its own spring member, then, it is conceivable too that both tensioning members are attached to opposite ends of the same spring member which is constructed as a draw spring. Such a draw spring then does not need to be attached to the operating beam because its position is entirely defined through the balance of tensile forces originating from the two tensioning members.

For properly leading the tensioning members into the operating beam it is possible that the operating beam comprises two reversal members at opposite ends for directing the tensioning members into its internal space. Such reversal members may comprise circle segments.

BRIEF DESCRIPTION OF THE DRAWINGS

Hereinafter aspects of the invention will be elucidated while referring to the drawing, in which.

DETAILED DESCRIPTION OF THE
ILLUSTRATIVE EMBODIMENTS

Figure 1:
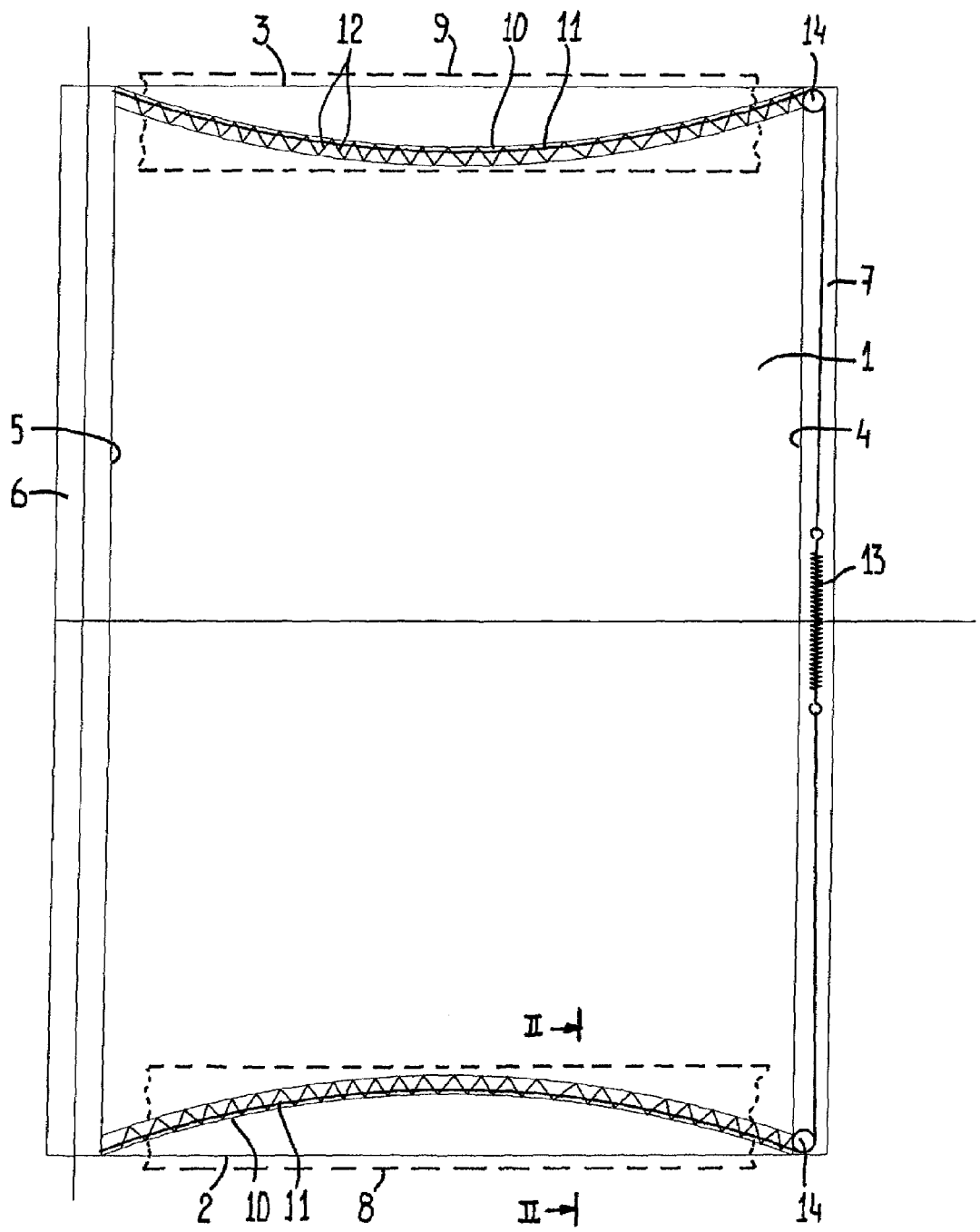
FIG. 1 illustrates, schematically and in a top plan view, an embodiment of a sunshade assembly.

Firstly referring to FIG. 1 an embodiment of a sunshade assembly is illustrated. It is noted that such a sunshade assembly for example may be used in combination with an open roof construction for a vehicle, in which case it is positioned below a roof opening in the roof of the vehicle which can be closed by a movable closure panel or alike.

The illustrated sunshade assembly comprises a flexible sunscreen 1 having two opposite lateral edges 2 and 3, a forward edge 4 and a rearward edge 5 (forward and rearward not necessarily being related to the orientation of the vehicle when applied to an open roof construction).

A rotatable winding shaft 6 is provided for, in a manner known per se, winding and unwinding the sunscreen 1 at its rearward edge 5. An operating beam 7 is connected to the forward edge 4 of the sunscreen 1 and will be operated (manually or driven by other drive means) for moving the sunscreen to a desired position between a fully open position (wound onto the winding shaft 6) and a fully closed position (fully wound off from the winding shaft, as illustrated in FIG. 1).

The sunshade assembly further comprises two spaced guiding members 8 and 9 (illustrated schematically in broken lines) cooperating with the opposite lateral edges 2 and 3 of the sunscreen 1. In the illustrated embodiment these guiding members 8 and 9 also cooperate with opposite ends of the operating beam 7 (as will appear from FIG. 2). This, however, is not necessary and it is conceivable too that the operating beam 7 cooperates with additional guiding members.

Near to each lateral edge 2 and 3 the sunscreen 1 is provided with a receiving arrangement 10 for slideably receiving a tensioning member 11. Each receiving arrangement 10 extends bow-shaped with its outer ends closer to the respective lateral edge 2 or 3 than its parts between said outer ends.

In the illustrated embodiment the receiving arrangements 10 each comprises a succession of separate loop stitches 12 positioned along a bow-shaped line. Each stitch 12 defines a loop wide enough for slideably accommodating the corresponding tensioning member 11.

Figure 3:
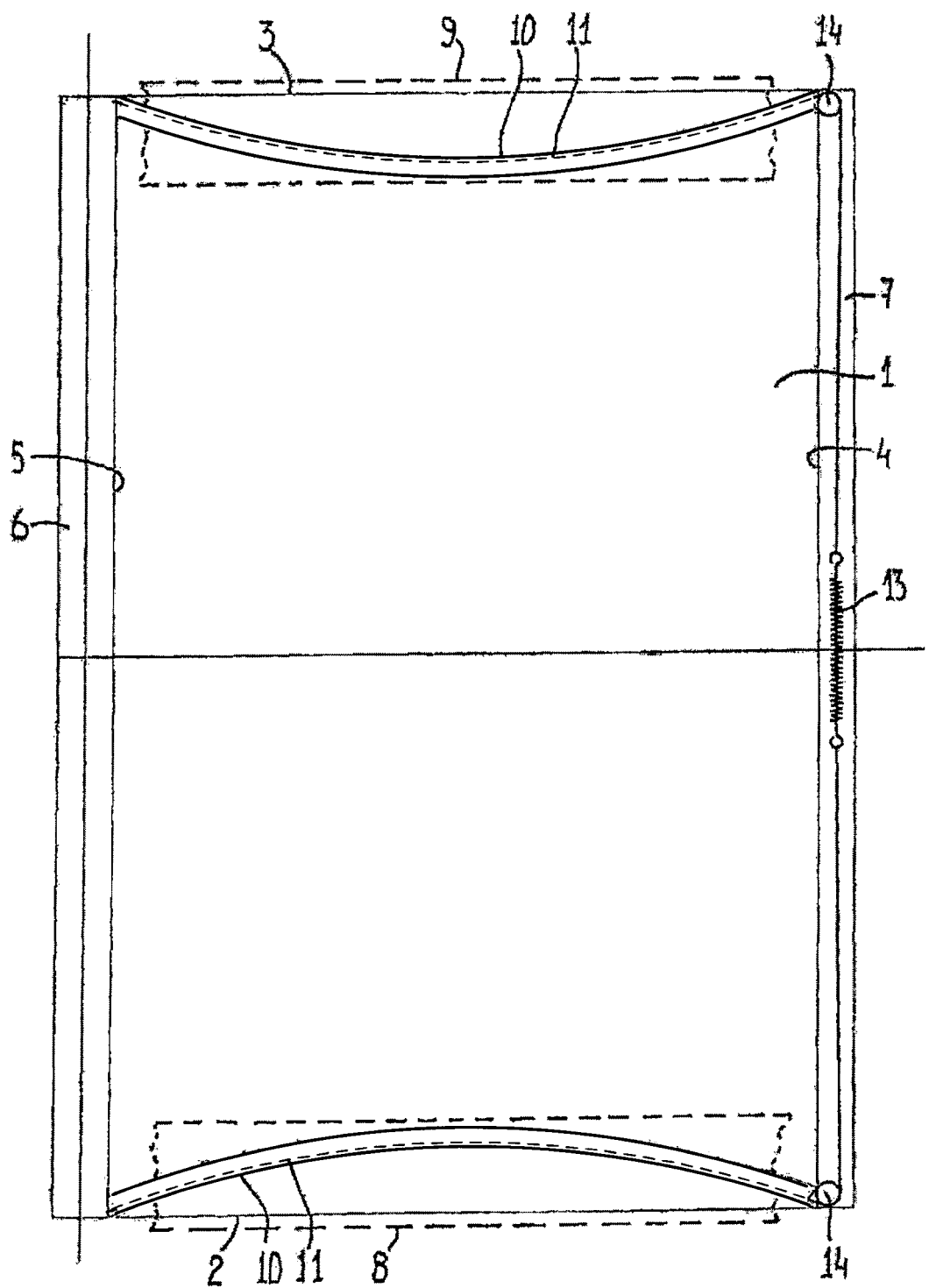
FIG. 3 illustrates, schematically and in a top plan view, an alternative embodiment of a sunshade assembly.
Figure 4:
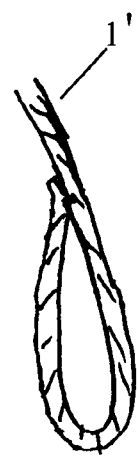
FIG. 4 illustrates, schematically and in a cross-section, an embodiment of a sunshade.
Figure 5:
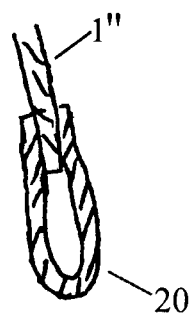
FIG. 5 illustrates, schematically and in a cross-section view, an embodiment of a sunshade.

In alternative embodiments illustrated in FIGS. 3-5 the receiving arrangements 10 may comprise an elongate channel attached to or integral with the sunscreen, for example defined by a channel-shaped pocket of sunscreen material itself 1' (FIG. 4) or of a different flexible material 20 attached to the sunscreen 1" (FIG. 5).

Each tensioning member 11 is a longitudinal member extending through a corresponding receiving arrangement 10 and being tensioned in its longitudinal direction. For example, each tensioning member 11 comprises a flexible rope, cable or alike of which one end is attached to the winding shaft 6 and of which the opposite end is attached to a spring member 13 for longitudinally tensioning the tensioning member.

In the illustrated embodiment of the sunshade assembly the spring member 13 is a draw spring provided in an internal space of the operating beam 7, wherein both tensioning members 11 are attached to opposite ends of said spring member 13. For this reason the operating beam 7 comprises two reversal members 14 at opposite ends for directing or guiding the tensioning members 11 into its internal space. Such reversal members 14 may comprise stationary circle segments, but also may be constructed as rotating rollers.

The draw spring 13 tensions the tensioning members 11 in a longitudinal direction. As a result the tensioning members 11 strive to straighten, causing an outwardly directed load acting upon the sunscreen 1 through the receiving arrangements 10. This will tension the sunscreen, especially in its central part between the winding shaft 6 and operating beam 7 and thus will reduce sagging of the sunscreen.

Figure 2:
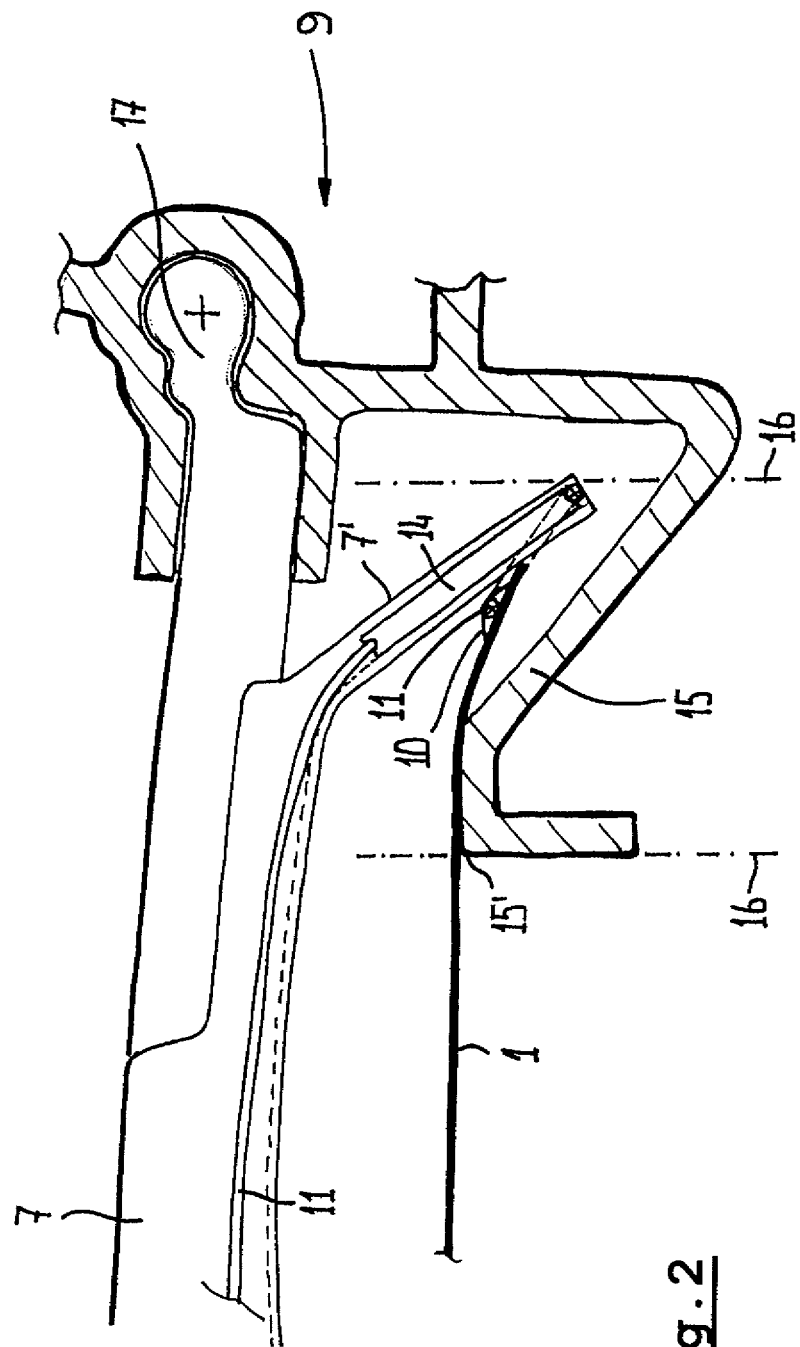
FIG. 2 shows, schematically on a larger scale and partly in a cross section, a view according to II-II in FIG. 1.

The spring member 13 allows the tensioning members 11 to move in the longitudinal direction, thus also allowing a compensation for length differences during winding/unwinding the sunscreen 1. Further the use of a single draw spring 13 positioned between both tensioning members 11 allows the introduction of symmetrical loads into the sunscreen, avoiding a distortion and misalignment thereof. Referring to FIG. 2 it is shown that a guiding member 9 comprises at least a guide leg 15 cooperating with the sunscreen 1 at a respective lateral edge. The position of the receiving arrangement 10 of the sunscreen is such that it is in an overlapping relation with said guide leg 15 along its entire length. Or in other words, referring to the view of FIG. 2 the receiving arrangement 10 does not extend further to the left than the left most end 15' of the guide part 15. As shown, it is not strictly necessary that the overlapping parts of sunscreen 1 and guide part 15 (within the boundaries of lines 16) contact each other everywhere.

FIG. 2 also illustrates the operating beam 7 of which opposite ends 17 (only one of which is illustrated here) cooperate with a dedicated part of the guiding member 9. An inclined part 7' of the operating beam 7 receives the reversal member 14 around which the tensioning member 11 extends.

The invention is not limited to the embodiments described before which may be varied widely within the scope of the invention as defined by the appending claims.

The invention claimed is:

1. A sunshade assembly, comprising:
a flexible sunscreen having two opposite lateral edges, a forward edge and a rearward edge,
a rotatable winding shaft configured to wind and unwind the flexible sunscreen at the rearward edge,
two flexible tensioning members,
an operating beam connected to the forward edge of the flexible sunscreen, and
two spaced guiding members cooperating with the opposite lateral edges of the flexible sunscreen,
wherein the flexible sunscreen near to each lateral edge is provided with a receiving arrangement, each receiving arrangement configured to slideably receive one of the flexible tensioning members therein,
wherein each receiving arrangement extends bow-shaped with its outer ends closer to the respective lateral edge than its parts between said outer ends, and
wherein each flexible tensioning member is a longitudinal member extending through a corresponding receiving arrangement and being tensioned in its longitudinal direction with the flexible sunscreen unwound from the rotatable winding shaft, the receiving arrangements with the flexible tensioning members disposed therein being wound and unwound on the rotatable winding shaft with the sunscreen.

2. The sunshade assembly according to claim 1, wherein the receiving arrangement comprises an elongate channel attached to or integral with the sunscreen.

3. The sunshade assembly according to claim 2, wherein the elongate channel is defined by a channel-shaped pocket of flexible material attached to the sunscreen.

4. The sunshade assembly according to claim 1, wherein the receiving arrangement comprises a succession of separate loop stitches positioned along a bow-shaped line and each wide enough for slideably accommodating the corresponding flexible tensioning member.

5. The sunshade assembly according to claim 1, wherein each guiding member comprises at least a guide leg cooperating with the sunscreen at a respective lateral edge and wherein a position of the receiving arrangement of the sunscreen is such that it is in an overlapping relation with said guide leg along its entire length.

6. The sunshade assembly according to claim 1, wherein the flexible tensioning members each comprise a flexible rope or cable of which one end is attached to the winding shaft and of which the opposite end is attached to a spring member for longitudinally tensioning the tensioning member.

7. The sunshade assembly according to claim 6, wherein the spring member is provided at the operating beam.

8. The sunshade assembly according to claim 7, wherein the operating beam comprises an internal space for accommodating the spring member.

9. The sunshade assembly according to claim 8, wherein both tensioning members are attached to opposite ends of the same spring member which is constructed as a draw spring.

10. The sunshade assembly according to claim 8, wherein the operating beam comprises two reversal members at opposite ends for directing the tensioning members into its internal space.

11. The sunshade assembly according to claim 10, wherein the reversal members comprise circle segments.

12. A sunshade assembly, comprising:
a flexible sunscreen having a forward edge and a rearward edge, wherein the forward edge and the rearward edge are disposed opposite each other with lateral edges extending therebetween;
a rotatable winding shaft connected to the rearward edge and configured to wind and unwind the flexible sunscreen;
an operating beam connected to the forward edge of the flexible sunscreen and configured to selectively displace the flexible sunscreen to a desired position;
two flexible tensioning members, each flexible tensioning member having an end attached to the rotatable winding shaft; and
two receiving arrangements connected to the flexible sunscreen to be wound and unwound with the flexible sunscreen on the rotatable winding shaft, each receiving arrangement extending along one of the lateral edges of the flexible sunscreen, with opposite ends disposed nearer each respective lateral edge than a portion of the receiving arrangement between the opposite ends, each receiving arrangement configured to slideably receive therein one of the flexible tensioning members extending in a longitudinal direction through the receiving arrangement that is wound and unwound on the rotatable winding shaft with the receiving arrangement; and
a spring member connected to an end of each of the flexible tensioning members remote from the end connected to the rotatable winding shaft, the spring member and the flexible tensioning members creating tension in the flexible tensioning members when the sunscreen is unwound from the rotatable winding shaft.

13. The sunshade assembly of claim 12, wherein each of the receiving arrangements comprises loop stitches, wherein each loop stich defines a loop to slideably receive the tensioning member, wherein the loop stitches are disposed along a bow-shaped line on the sunscreen.

14. The sunshade assembly of claim 12, wherein each receiving arrangement comprises an elongate channel formed by a flexible material.

15. A sunshade assembly, comprising:
a flexible sunscreen having a forward edge and a rearward edge, wherein the forward edge and the rearward edge are disposed opposite each other with lateral edges extending therebetween;
a rotatable winding shaft connected to the rearward edge and configured to wind and unwind the flexible sunscreen;
an operating beam connected to the forward edge of the flexible sunscreen and configured to selectively displace the flexible sunscreen to a desired position;
two flexible tensioning members, each flexible tensioning member having an end attached to the rotatable winding shaft and an opposite end coupled to the operating beam; and
two receiving arrangements connected to the flexible sunscreen to be wound and unwound with the flexible sunscreen on the rotatable winding shaft, each receiving arrangement being connected to the flexible sunscreen and having one of the flexible tensioning members disposed therein from the rearward edge to the forward edge of the flexible sunscreen, the receiving arrangements, the rotatable winding shaft and the flexible tensioning members being connected such that when the flexible sunscreen is fully unwound from the rotatable winding shaft each tensioning member has tension therein and each respective receiving arrangement is bow-shaped from the forward edge of the flexible sunscreen to the rearward edge of the flexible sunscreen to create tension in the flexible sunscreen between the receiving arrangements.

16. The sunshade assembly of claim 15, wherein each of the receiving arrangements comprises loop stitches, wherein each loop stich defines a loop to slideably receive the tensioning member, wherein the loop stitches are disposed along a bow-shaped line on the sunscreen.

17. The sunshade assembly of claim 15, wherein each receiving arrangement comprises an elongate channel formed by a flexible material.

* * * * *

UNITED STATES PATENT AND TRADEMARK OFFICE
CERTIFICATE OF CORRECTION

PATENT NO.        : 8,689,853 B2
APPLICATION NO.   : 13/147548
DATED             : April 8, 2014
INVENTOR(S)       : Clephas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 159 days.

Signed and Sealed this

Twenty-ninth Day of September, 2015

Michelle K. Lee
*Director of the United States Patent and Trademark Office*